United States Patent [19]

Dagenais

[11] Patent Number: 4,518,232

[45] Date of Patent: May 21, 1985

[54] METHOD AND APPARATUS FOR OPTICAL BEAM SHAPING

[75] Inventor: Dominique M. Dagenais, Wellesley Hills, Mass.

[73] Assignee: Avco Everett Research Laboratory, Inc., Everett, Mass.

[21] Appl. No.: 525,868

[22] Filed: Aug. 24, 1983

[51] Int. Cl.³ .............................................. G02B 5/10
[52] U.S. Cl. ................................... 350/620; 350/613; 219/121 LQ
[58] Field of Search ............... 350/294, 292, 293, 296, 350/613, 620, 320; 219/121 LQ, 121 LP, 121 L, 121 LM, 121 LE, 121 LF, 121 LA

[56] References Cited

U.S. PATENT DOCUMENTS

| | | | |
|---|---|---|---|
| 4,132,955 | 1/1979 | Hughes | 330/4.3 |
| 4,153,929 | 5/1979 | Laudenschlarger et al. | 350/292 |
| 4,200,846 | 4/1980 | Stark, Jr. et al. | 331/94.5 R |
| 4,264,869 | 4/1981 | Hunter | 330/4.3 |
| 4,271,360 | 6/1981 | Ward | 350/299 |
| 4,311,360 | 1/1982 | Hodson et al. | 350/174 |
| 4,345,212 | 8/1982 | Seppala et al. | 330/4.3 |
| 4,475,027 | 10/1984 | Pressley | 350/294 |

*Primary Examiner*—Jon W. Henry
*Attorney, Agent, or Firm*—M. E. Frederick

[57] ABSTRACT

A method and apparatus for transforming an obscured beam into a uniform intensity pattern at the image plane of the apparatus are described. Apparatus for carrying out the invention comprises two on-axis optical elements which are designed for stigmatic imaging of an incoming obscured parallel laser beam. The first element, a paraboloid mirror, forms an imaginary stigmatic image of the beam at its focal point. The second element, a multi-faceted mirror, comprises identical flat facets disposed on an ellipsoid envelope. The ellipsoid conjugates the focal point of the paraboloid and the image plane. Selection of an image shape and dimension defines the shape and dimension of the facets. Each facet's contribution to the image is a full scale centered spot. The contribution of each facet add up to form a final uniform image. Slight variation of the image dimension, from facet to facet, allows a roll-off of the image and compensates for diffraction ripples by the edges of the facets.

10 Claims, 3 Drawing Figures

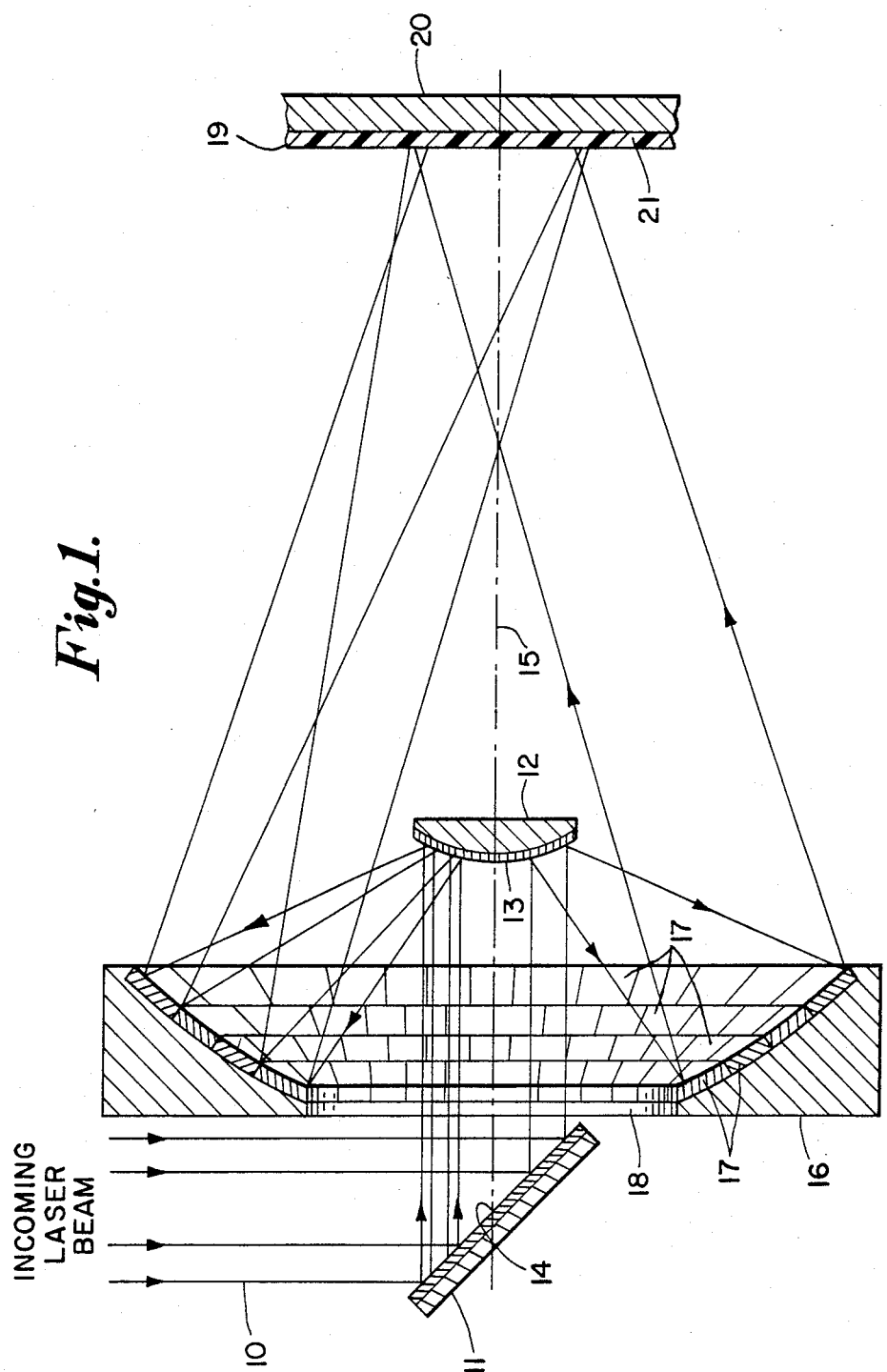

METHOD AND APPARATUS FOR OPTICAL BEAM SHAPING

This invention relates to a method of shaping an optical beam and to apparatus for carrying out this method.

BACKGROUND OF THE INVENTION

This application describes an invention made or partially made in the course of work under a U.S. Government contract, viz Air Force Contract No. F33615-82-C-5045.

Maintenance of metal, composites, and other materials covered or painted with a material of poor thermal conductivity such as, for example, paint, grease, ceramics, and the like is quite often a substantial contributor to the cost of ownership. Thus maintenance of painted surfaces is a substantial contributor to the cost of owning aircraft. Stripping of old paint prior to repainting is frequently a necessary maintenance operation.

Toxic, phenolic paint-stripping solvents are labor intensive and hazardous to use. Acids and abrasives damage airframe exteriors, and residual moisture from solvents trapped by skin seams and rivets promotes corrosion.

Paint-stripping damage to a composite aircraft surface is more severe than to a metallic aircraft surface because the boundary between the paint and the airframe material is less distinct for composite structures.

A non-solvent paint-stripping technique proposed for use involves the use of high energy flashlamps. Whether or not this technique will be found to be useful depends on the extent to which the difference in thermal expansion properties of paint and metal is great enough and operative when exposed to a high-energy flashlamp to break the adhesive seal that bonds the paint to the metal.

Another non-solvent paint stripping method described in patent application Ser. No. 342,787 filed Jan. 26, 1982 now abandoned and assigned to the same assignee as this case and which is incorporated herein as if set out at length, involves removing paint and the like from a substrate by ablation without damage to the substrate or its surface by delivering to the material to be removed laser pulses having a wavelength at which the paint is opaque and a fluence sufficient to ablate or decompose the material without damaging or adversely affecting the substrate or its surface.

Paint is removed by sweeping the paint with a pulsed laser beam. The laser beam must have a wavelength at which the material to be removed is opaque and must be carefully controlled to cause ablation of the material to be removed without damaging the substrate or its surface. For this purpose, the fluence of each pulse of the laser beam delivered to the material must be carefully selected to be sufficient to bring the surface of the paint to steady-state ablation, but insufficient to cause plasma formation with accompanying damage to the substrate.

The laser beam used for paint stripping purposes should have a substantially uniform fluence at the work surface and for stripping paint from composite substrates, a variation in fluence of not greater than about ten percent. Further, the beam should be formed to have a reasonable depth of focus to permit substantially uniform treatment of curved surfaces and should have a roll-off of intensity at its edges to reduce the possibility of over exposure in those regions where the direction of the laser beam to a new region overlaps a portion already treated.

The formation of such a laser beam at the work surface that is not subject to asymmetry and aberrations, even if they exist in the output beam of the laser, and the cross section of which is independent of the shape and intensity distribution of the laser beam at the output of the laser is particularly desirable, especially when an inner portion of the output beam of the laser is obscured as is the case when the laser beam is generated with an unstable resonator. It is further desirable, as in the case of paint stripping, for example, that any laser beam shaping apparatus, since it will most likely be carried at the tip of a robotic arm, be as small and light as possible while still providing a useful depth of field.

It is a principal object of this invention to provide a method of shaping a laser beam and to provide apparatus for carrying out this method that accomplishes all of the above-noted objects.

SUMMARY OF THE INVENTION

Two on-axis optical elements designed for stigmatic imaging of an incoming laser beam, the center portion of which is obscured, are provided. The first element, a paraboloid mirror, forms an imaginary stigmatic image of the beam at its focal point. The second element, a multi-faceted mirror, comprises identical flat facets disposed on an ellipsoid envelope. The ellipsoid conjugates the focal point of the paraboloid and the image plane. Selection of an image shape and dimension defines the shape and dimension of the facets. Each facet's contribution to the image is a full scale centered spot. The contribution of each facet add up to form a final uniform image. Slight variation of the image dimension, from facet to facet, allows a roll-off of the image and compensates for diffraction ripples by the edges of the facets.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

DESCRIPTION OF THE DRAWINGS

FIG. 1 is a diagrammatic illustration of apparatus in accordance with the invention;

DETAILED DESCRIPTION OF THE INVENTION

Figure 3:
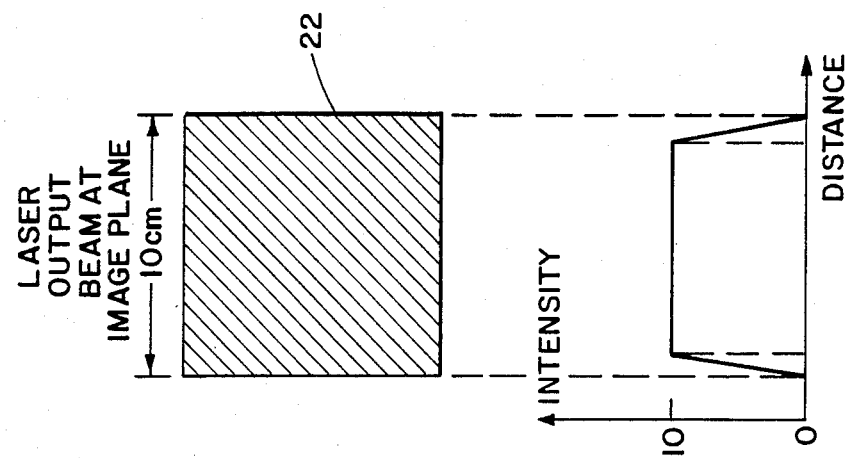
FIG. 3 is a sectional front view of a laser beam of FIG. 2 modified in accordance with the invention and taken at the work surface or image plane together with a preferred intensity pattern of the modified laser beam at the image plane.

Referring now to FIG. 1, there is shown an arrangement wherein a laser beam 10 produced by a typical laser having an unstable resonator is received by a first directing mirror 11 and reflected to a paraboloid mirror 12 having a parabolic reflecting surface 13 preferably concentric with the center 14 of the first mirror 11. The incoming laser beam 10 preferably is adapted to impinge on the first mirror 11 concentric about its center point 14. Accordingly, the incoming laser beam is caused to impinge concentrically on paraboloid mirror 12. Such an output laser beam 10 may typically have a rectangular configuration the center of which is obscured as shown by way of example in FIG. 2. The paraboloid mirror 12 is formed to divergently reflect the laser beam. The paraboloid mirror 12 forms an imaginary stigmatic image of the incoming laser beam at its focal point which is located on the center axis 15 which passes through the center point 14 of the first mirror 11 and about which point the incoming laser beam 10 is concentric. It is to be understood that the incoming laser beam may impinge directly on the paraboloid mirror 12 and/or other conventional optical arrangements may be used, depending on the circumstances under which the invention is to be used, to process and/or direct the incoming laser beam to the paraboloid mirror 12. Disposed between the first mirror 11 and the paraboloid mirror 12, also preferably concentric about the center axis 15 and normal thereto, is a multi-faceted mirror 16 comprised of typically identical flat facets 17 disposed on an ellipsoid envelope open at its center 18 to permit the incoming laser beam 10 reflected from the first mirror 11 to pass therethrough and be received by the paraboloid mirror 12. The ellipsoid multi-faceted mirror 16 receives the now uniformly expanded laser beam from the paraboloid mirror 12 and reflects it as a plurality of small portions to an image plane 19 which includes the furthest focal point of the ellipsoid envelope. The focal point of the paraboloid mirror 12 coincides with the closest focal point of the ellipsoid envelope.

While a square input laser beam and square facets are shown by way of example, it is to be understood that other input laser beam shapes and facet configurations may be used. Selection of a desired image shape and dimension at the image plane or working surface 19 determines the shape and dimension of the facets 17. If, for example, the size of the facets is made bigger, the image at the image plane will be increased and vice versa. Further, the shape of the laser beam at the image plane is controlled by the shape of the facets thereby allowing a wide variation in the shape of incoming laser beams as well as a wide variation in the shape of the laser beam at the image plane. The optical parameters are preferably selected in conventional manner to provide a reasonable focal depth to permit, for example, wide tolerances in the location of the working surface and/or satisfactory processing of curved surfaces.

Each facet is mounted on the ellipsoid envelope in any suitable manner and shaped, sized and orientated to provide the desired shape and size at the image plane or working surface 19 which, typically, is a metal substrate 20 covered with paint 21. The image plane and, hence, preferred location of the working surface is located within the focal depth of the ellipsoid mirror. Preferably, the ellipsoid mirror should have a depth of focus of greater than about ten millimeters and less than about ten centimeters. The portion of the laser beam reflected by each facet 17 typically has substantially the same shape and size at the image plane and is concentric about the center axis 15 at this point whereby that reflected by each of the facets 17 are concentrically combined at the image plane 19 as full scale centered spots and add one to another to form a final uniform image 22 having the desired size and energy distribution such as, for example, as shown in FIG. 3.

The facets 17 may be adjustably mounted on and carried by the ellipsoid mirror such that each of their center points are located on the ellipsoid envelope and each facet therefor always lies in a plane tangent to the ellipsoid envelope. The facets may be attached by, for example, any conventional adjustable three-point arrangement to permit their individual adjustment about their center point in conventional manner to center their image about a desired point in the image plane at a desired point within the focal depth.

Inspection of the optical path rays shown in FIG. 1 will show that successive small portions of the incoming laser beam are expanded a first time by the paraboloid mirror 12 and thereafter each such small portion is reflected in a continuing divergent manner by a different facet 17 to the full size of the laser beam or image at the work surface. As will now be evident, aberrations, nonuniformities, and the like present in a large number of small portions of the laser beam at the surface 13 of the paraboloid mirror 12 are each greatly reduced in magnitude and severity at the working surface since they have each been expanded over the entire cross sectional area of the laser beam at the working surface. Further, the undesirable effect on energy distribution of the obscured center of the incoming laser beam (see FIG. 2) is eliminated at the working surface.

For the above-noted reason, nonuniformities in the incoming laser beam are smoothed out and virtually eliminated. Further, since the dimension of the different portions of the beam reflected from the facets 17 comprising the ellipsoid mirror 16 can be dimensioned as desired, substantially any beam size, configuration and/or intensity profile can be produced.

Figure 2:
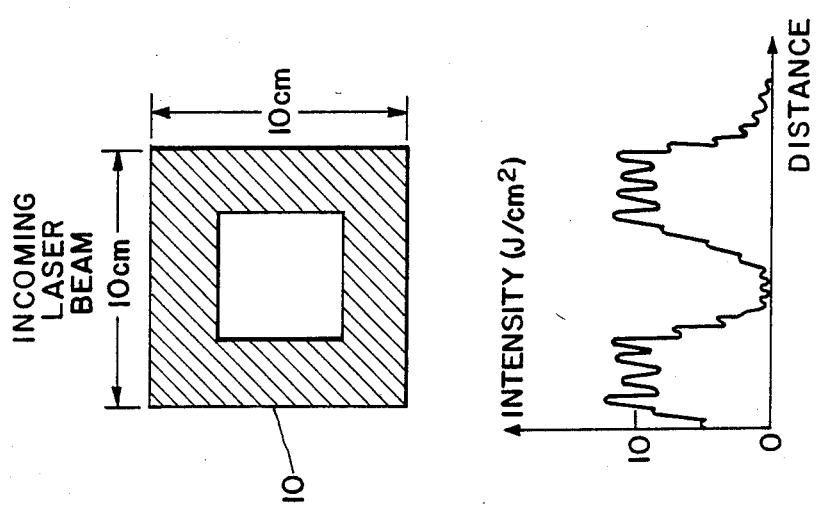
FIG. 2 is a sectional front view of a rectangular output laser beam from a typical laser with a rectangular obscured center portion together with a typical intensity pattern of such a laser beam.

By way of comparison, FIG. 3 illustrates the conversion of the obscured square, nonuniform beam of FIG. 2 to a uniform beam of the same dimensions, but with a controlled intensity roll-off at the edges. Thus, in the stripping of paint, for which a square beam is ideally suited, an intensity roll-off at the edges of the beam at the work surface as shown in FIG. 3, permits overlap of the edges of the beam with the overlapped portion receiving substantially the same amount of energy as that received at the center portion of the beam.

The intensity roll-off as shown in FIG. 3 is inherent in the present invention because the optical distance involved for each of the facets is different and this results in a difference in magnification for each facet. Thus, the further a facet is from the optical axis, the closer it will be to the image plane and therefore provide a smaller image in the image plane than that of a facet that is closer to the image plane.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. Apparatus for optically modifying a laser beam to provide at an image plane a modified final image having predetermined shape, dimension and energy distribution comprising:
   (a) paraboloid mirror means for receiving a laser beam and reflecting it, said mirror means having a first focal point disposed and substantially uniformly divergently reflecting said laser beam concentrically as if it emanated from said focal point; and (b) a plurality of small flat mirrors for collectively receiving substantially all of said laser beam reflected from said paraboloid mirror means, each said flat mirror having a shape substantially the same as that of said final image and reflecting a small portion of the laser beam to said image plane concentric about a center point in said image plane, the portion of said laser beam reflected from each flat mirror having said predetermined dimensions and shape at said image plane, the portions of said laser beam reflected by said flat mirrors combining at said image plane to form said modified final image having said predetermined shape, dimensions and energy distribution.

2. The combination as defined in claim 1 wherein said flat mirrors each have a center point and said center points all lie on and define a ring-shaped portion of an ellipsoid surface.

3. The combination as defined in claim 2 wherein said ring-shaped portion has a second focal point and said first and second focal points at least substantially coincide.

4. The combination as defined in claim 3 wherein said first and second focal points and said center point in said image plane all lie on a common axis.

5. The combination as defined in claim 4 wherein said flat mirrors are each adjustable about their center points whereby their reflective surfaces always lie in a plane at least substantially tangent to said ellipsoid surface.

6. The combination as defined in claim 5 wherein said flat mirrors substantially define an ellipsoid surface having a depth of focus greater than about ten millimeters and said image plane lies in said depth of focus.

7. Apparatus for optically modifying a laser beam to provide at an image plane a modified final image having predetermined shape, dimensions and energy distribution comprising:

(a) paraboloid mirror means for receiving a laser beam and reflecting it, said mirror means having a first focal point and substantially uniformly divergently reflecting said laser beam as if it emanated from said focal point;

(b) an annular shaped support member having a substantially ellipsoid surface, said laser beam being received by said paraboloid mirror means through the center of said support member; and (c) a plurality of small flat mirrors for collectively receiving substantially all of said laser beam reflected from said paraboloid mirror means and adjustably carried by said support member and covering said ellipsoid surface, said small flat mirrors each having a center point lying on said ellipsoid surface whereby said flat mirrors each always lie in a plane at least substantially tangent to said ellipsoid surface, said ellipsoid surface having a second focal point substantially coincidental with said first focal point, said ellipsoid surface having a third focal point lying within a depth of focus of about ten centimeters, said plurality of small flat mirrors collectively receiving substantially all of said laser beam reflected from said paraboloid mirror means, each said flat mirror having a shape substantially the same as that of said final image and each reflecting a small portion of the laser beam to said image plane concentric about a center point in said image plane, said first, second and third focal points and said center point lying on a common axis, the portion of said laser beam reflected from each flat mirror having substantially said predetermined dimensions and shape at said image plane, the portions of said laser beam reflected by all of said flat mirrors combining at said image plane to form said modified final image having said predetermined shape, dimensions and energy distribution.

8. Process for optically modifying a laser beam to provide at an image plane a modified final image having predetermined shape, dimensions and energy distribution comprising:

(a) receiving a laser beam and reflecting it from paraboloid mirror means having a first focal point and substantially uniformly divergently reflecting said laser beam as if it emanated from said focal point;

(b) directing substantially all of said diverging reflected laser beam to a plurality of annularly arranged small substantially flat mirrors in at least substantially abutting relationship;

(c) shaping each said flat mirror to have a shape substantially the same as that of said final image; and (d) adjustably directing each flat mirror to each reflect a small different portion of the laser beam to said image plane concentric about a center point in said image plane, the portion of said laser beam reflected from each flat mirror having substantially said predetermined dimensions and shape at said image plane, the portions of said laser beam reflected by said flat mirrors being directed to combine at said image plane to form said modified final image having said predetermined shape, dimensions and energy distribution.

9. Process as defined in claim 8 wherein each flat mirror has a center point and said center points are disposed on and define a ring-shaped portion of an ellipsoid surface.

10. Process as defined in claim 9 wherein said ellipsoid surface has a second and a third focal point, said second focal point is coincident with the paraboloid mirror means first focal point, said third focal point at least adjacent said image plane and said first, second and third focal points and said center point in said image plane all lie on a common axis.

* * * * *